(12) United States Patent
Wieczorek et al.

(10) Patent No.: US 12,296,653 B2
(45) Date of Patent: *May 13, 2025

(54) AIR VENT AND VEHICLE WITH AN AIR VENT

(71) Applicant: MOTHERSON INNOVATIONS COMPANY LIMITED, London (GB)

(72) Inventors: Romeo Wieczorek, Stuttgart (DE); Torsten Weingärtner, Göttingen (DE)

(73) Assignee: Motherson Innovations Company Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,826

(22) Filed: Feb. 28, 2023

(65) Prior Publication Data

US 2023/0211650 A1    Jul. 6, 2023

Related U.S. Application Data

(63) Continuation of application No. 16/960,731, filed as application No. PCT/EP2018/086263 on Dec. 20, 2018, now Pat. No. 11,618,303.

(30) Foreign Application Priority Data

Jan. 9, 2018    (DE) .................... 10 2018 100 326.9

(51) Int. Cl.
| | | |
|---|---|---|
| *B60H 1/34* | (2006.01) | |
| *B60H 1/24* | (2006.01) | |
| *F24F 13/14* | (2006.01) | |

(52) U.S. Cl.
CPC ........... *B60H 1/3421* (2013.01); *B60H 1/345* (2013.01); *B60H 1/24* (2013.01);
(Continued)

(58) Field of Classification Search
CPC ........ B60H 1/3421; B60H 1/345; B60H 1/24; B60H 1/3414; B60H 2001/3471; F24F 13/1426; F24F 2013/144
(Continued)

(56) References Cited

U.S. PATENT DOCUMENTS

| | | | |
|---|---|---|---|
| 5,340,357 A  * | 8/1994 | Nagai ................ | B29C 45/0017 |
| | | | 454/319 |
| 8,230,650 B1 | 7/2012 | Stamps | |

(Continued)

FOREIGN PATENT DOCUMENTS

| | | |
|---|---|---|
| DE | 29716410 U1 | 11/1997 |
| DE | 102013209430 | 9/2014 |

(Continued)

OTHER PUBLICATIONS

International Search Report dated May 31, 2019 of International application No. PCT/EP2018/086263.
(Continued)

*Primary Examiner* — Steven B McAllister
*Assistant Examiner* — Charles R Brawner
(74) *Attorney, Agent, or Firm* — Jones Day

(57) ABSTRACT

An air vent for a vehicle includes a housing with an air inlet, an air outlet, and an air channel between the air inlet and the air outlet; a rigid air directing body arranged within the air channel and pivotably arranged within the housing by being affixed to a first axis; an actuator arranged within the housing in order to act on the rigid air-directing body to determine a direction of an air stream exiting the air outlet, the actuator comprising a transmission element affixed to a second axis and pivotable around the second axis.

19 Claims, 1 Drawing Sheet

(52) U.S. Cl.
CPC ............... *B60H 2001/3471* (2013.01); *B60H 2001/3485* (2013.01); *F24F 13/1426* (2013.01); *F24F 2013/144* (2013.01)

(58) Field of Classification Search
USPC ...................................................... 454/155
See application file for complete search history.

(56) References Cited

U.S. PATENT DOCUMENTS

| | | | |
|---|---|---|---|
| 11,618,303 B2* | 4/2023 | Wieczorek | B60H 1/3414 454/155 |
| 2007/0123158 A1 | 5/2007 | Shibata et al. | |
| 2007/0243810 A1 | 10/2007 | Browne et al. | |
| 2012/0184195 A1 | 7/2012 | Browne et al. | |
| 2013/0037252 A1 | 2/2013 | Major et al. | |
| 2014/0357179 A1* | 12/2014 | Londiche | C22C 38/44 454/322 |
| 2017/0370611 A1 | 12/2017 | Link et al. | |
| 2018/0086182 A1* | 3/2018 | Gareis | B60H 1/3421 |
| 2018/0319248 A1 | 11/2018 | Pacher | |

FOREIGN PATENT DOCUMENTS

| | | |
|---|---|---|
| JP | S61 46333 U | 3/1986 |
| JP | S61 211123 A | 9/1986 |
| JP | 2007 153121 A | 6/2007 |

OTHER PUBLICATIONS

Written Opinion dated May 31, 2019 of International application No. PCT/EP2018/086263.

* cited by examiner

AIR VENT AND VEHICLE WITH AN AIR VENT

CROSS-REFERENCE TO RELATED APPLICATIONS

This application is a Continuation of U.S. application Ser. No. 16/960,731, filed on Jul. 8, 2020, which is a National Stage Entry of International Patent Application No. PCT/EP2018/086263, filed Dec. 20, 2018, which claims the benefit of priority to German Patent Application No. DE 10 2018 100 326.9, filed Jan. 9, 2018, each of which is hereby incorporated by reference in its entirety for all purposes.

BACKGROUND

1. Field of the Invention

The invention relates to an air vent for a vehicle and to a vehicle with such an air vent.

2. Related Art

Air vents in vehicles direct environmental air or recirculated air, which has been conditioned by an air conditioning system or a heating system, towards the interior of the vehicle. In order to provide maximum comfort for the driver and passengers of the vehicle, the direction of the air provided for the interior can usually be adjusted. Said adjustment is usually provided by systems of lamellae or air foils, which can be automatically positioned by means of electric drives.

Due to the quiet nature of modern electric vehicles, the actuator noise and air flow noise of such systems has become increasingly noticeable. This reduces the comfort for the vehicle's passengers.

In order to provide a quieter air vent, DE 10 2013 209 430 B3 discloses air vents with a housing, an air inlet opening located in the axial direction of the housing and an air outlet opening opposite the air inlet opening, and an air guide surface located in the housing, wherein, in the axial direction of the housing seen, the air guide surface has an air inlet opening facing first end and an air outlet opening facing the second end, wherein the first end and the second end are arranged immovably on the housing in axial direction of the housing, and wherein the air guide surface is at least partially reversibly deformable between a first position and a second position in the direction of an inner wall of the housing. The deformable portion of the air guide surface comprises a shape memory material, with the air guide surface being reversibly deformable due to shape transformation of the shape memory material.

Thus, an air outlet with a housing containing a reversibly deformable air foil which can direct the air stream according to the activation or deactivation of a shape memory alloy actuator is known. However, such air foil based systems still produce a significant amount of undesirable flow noises, which are noticeable to the passengers of the vehicle.

JP S61 211123 A describes an on vehicle air conditioner to keep the head cool and the feet warm effectively by allowing both warm and cool air, which is inducted into a central blow-off duct under a bi-level mode, to be switched over by a wind direction switch-over means so as to permit cool air to be blown off to the upper half of a crew's body, and also permit warm air to be blown off to the lower half of the body by turns. When a switch-over lever is placed on a bi-level mode, dampers which are arranged to an upper and lower blow-off ducts, respectively, are opened. On the other hand, air flow distributing dampers which are arranged in a warm air and a cool air blow-off duct of a central blow-off duct, respectively, are opened to the maximum extent with a KNEE knob is turned to the maximum position. And when a FACE lever is placed to the COOL side and a FOOT lever is placed to the HOT side, cool air is forwarded to an upper blow-off outlet and the cool air blow-off duct, and warm air is forwarded to the lower blow-off duct and the warm air duct. And a wind direction switch-over means arranged at a central outlet is switched over intermittently allowing cool and warm air to be blown off by turns. The wind direction switch-over means comprises a rotor grill with curved groove-shaped guides at two end portions thereof for a rod fixed to the side surface of the central outlet. A temperature actuating coil made of a shape memory alloy is fixed between the rod and a lower inner end of the rotor grill; and a bias coil is fixed between and outer end above the rotor grill and a further rod fixed above the central outlet, and works in conjunction with the temperature actuating coil to rotate the rotor grill. This is a rather complicated structure.

JP 2007 153121 A discloses a blow-out grille of air conditioner for an automobile, which utilizes a blow port and reduces noise of blown air. A grille has a louver mounted on a side vent blow port in a frame for blowing conditioned air into a cabin to vary an air direction of the conditioned air blowing from the side vent blow port. The grille is also provided with a shape memory spring between the frame and the louver for changing the direction of the louver with a prescribed temperature as a boundary. The direction of the conditioned air is automatically changed into a first direction and a second direction with the prescribed temperature as a boundary.

An air outlet of an air conditioner of JP S61 46333 U has a plurality of fins that are swingably supported in conjunction with the support member, wherein the outermost one of the fins expands on the low temperature side and contracts on the high temperature side. When a shape memory coil is pulled by an alloy coil, the outermost fin on the opposite side is pulled by the bias coil, and the shape memory coil extends and the fin oscillates, such that the air of the outermost fin to which the shape memory alloy coil is attached is drawn. An air outlet of the air conditioner in which an end portion of the fin on the upstream side hits a wall surface of a housing to block the flow of air to the shape memory coil.

DE 297 16 410 U1 refers to a heating or air conditioning system of a motor vehicle with at least one air duct and at least one outflow nozzle, which comprises at least one air guiding element which can be adjusted automatically as a function of the air temperature by means of an adjusting device comprising a bimetal. The at least one outflow nozzle is arranged near the pane, and the actuating device is designed such that at air temperatures below a limit temperature the air flows as cold air via the air guide element directly into the vehicle interior and at air temperatures above the limit temperature flows as warm air against the pane.

It is thus the technical problem underlying the present invention to provide a particularly quiet air vent. It is a further object of the present invention to provide a vehicle with such an air vent.

SUMMARY

The air vent of the invention comprises a housing with an air inlet, an air outlet and an air channel between the air inlet and the air outlet, at least one rigid air directing body, in particular a single rigid air directing body, arranged within the air channel, and an actuator arranged within the housing in order to act on the rigid air-directing body to determine the direction of an air stream exiting the air outlet, wherein the actuator comprises a shape memory alloy element.

The combination of a shape memory alloy actuator and a preferably single rigid air directing body minimizes actuator noises as well as air flow noises within the air vent, thus providing a particularly quiet air vent system. Moreover, integrating the air directing body as well as the actuator within the housing leads to a very compact air vent, which is at the same time optically pleasing and open for a multitude of design considerations.

The air directing body may be pivotably arranged within the housing, preferably by being affixed to a first axis, and/or the actuator is pivotably arranged within the housing, preferably by affixed to a second axis.

With the pivotable air directing body, the air stream through the air vent can easily be directed by simply pivoting the air-directing body, thus alleviating the necessity for complex mechanical systems. As with the air directing body itself, this provides a mechanically particularly simple construction, which is easy to mount and operates with a minimum of movable parts.

The first axis and the second axis can run parallel to each other. The first axis and the second axis can be arranged orthogonal to the longitudinal axis of the air channel.

In a further preferred embodiment of the invention, the actuator comprises a transmission element affixed to the second axis and pivotable around the second axis by the shape memory alloy element.

The transmission element allows for transfer of the force provided by the shape memory alloy element to the air directing body, providing additional leverage. The forces enacted by the shape memory alloy element can consequently be rather low, so that a particularly compact shape memory alloy actuator can be used.

In a further preferred embodiment of the invention, the transmission element comprises a convex surface engaging with a complementary concave surface of the air-directing body.

This is a particularly simple way to transfer forces between the actuator and the air directing body.

In a further preferred embodiment of the invention, the concave surface is spaced apart from the first axis and/or facing in the direction of the air inlet, and the convex surface is spaced apart from the second axis and/or facing in the direction of the air outlet.

In this manner, leverage is provided for the actuator as well as for the air directing body itself, allowing for a movement of the air directing body with minimum force.

It is also preferred that the air channel comprises a lower air channel and/or an upper air channel, and the shape memory alloy element is adapted to rotate the transmission element within the air channel in order to determine the lower and upper air channels.

This separates the actuator entirely from the air-directing body. Moreover, a rotational shape memory alloy actuator is particularly compact and light.

In a further preferred embodiment of the invention, the air-directing body is aerodynamically shaped, in particular torpedo shaped.

Such a shape of the air directing body allows for an essentially laminar air flow around the air directing body, thus minimizing flow noise.

In a further preferred embodiment of the invention, the air outlet forms a nozzle.

Such a shape of the air outlet helps directing the air stream emitted from the air vent and allows for a particularly high control of the air flow direction.

The invention further relates to a vehicle with an air vent of the described manner. The advantages explained above also come to bear in this case.

BRIEF DESCRIPTION OF THE DRAWINGS

In the following, the invention and its embodiments are further explained with reference to the drawings, which show in FIG. 1 is a schematic representation of an embodiment of an air vent according to the invention configured for a straight air outlet direction.

DETAILED DESCRIPTION

Figure 1:
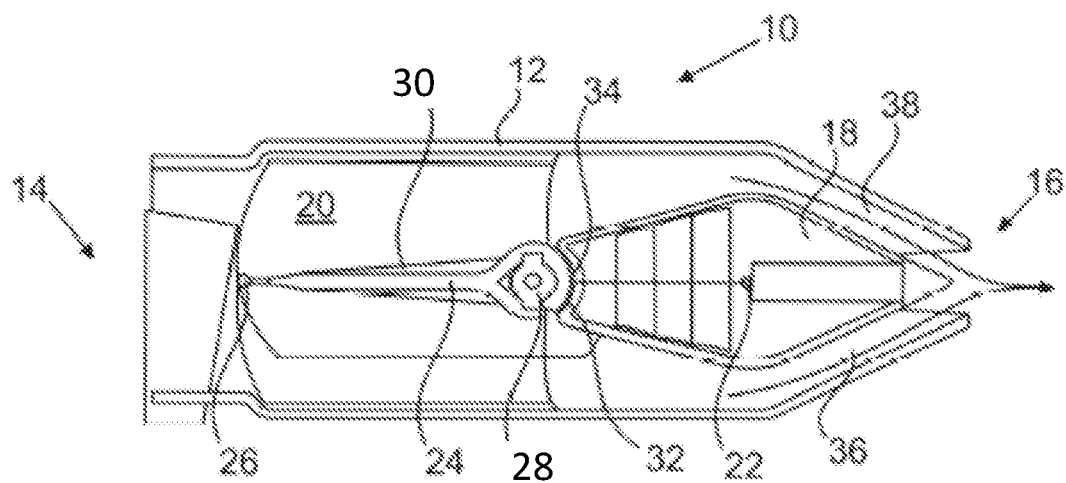

An air vent 10 of the invention comprises a housing 12 with an air inlet 14 and an air outlet 16. Conditioned air is provided to the air inlet 14 and directed by the air vent 10 through the air outlet 16 into the interior (not shown) of a vehicle.

In order to control the direction of air leaving the air outlet 16, an air directing body 18 is arranged within an air flow channel 20 defined by the housing 12. The air guiding body 18 is pivotably affixed to a first axis 22. In order to control the orientation of the air guiding body 18 within the air channel 20, an actuator 24 is arranged within the housing 12 and affixed pivotably to a second axis 26. The actuator 24 comprises a transmission element 28 and a shape memory alloy element 30.

A convex surface 32 of the transmission element 28 engages with a complementary concave surface 34 of the air guiding body 18. The convex surface 32 is oriented toward the air outlet 16, while the concave surface 34 is oriented toward the air inlet 14.

The air outlet 16 forms a nozzle, helping to direct the air flow. The air guiding body 18 is aerodynamically shaped, in particular torpedo shaped, complementing the cross-sectional geometry of the nozzle of the air outlet 16.

FIG. 1 shows the air vent 10 in a configuration for straight-forward air flow. In this configuration, the air guiding body 18 is in a central, horizontal position, so that a lower air channel 36 and an upper air channel 38 are formed between the air guiding element 18 and the housing 12. Air provided through the air inlet 14 can stream through the lower air channel 36 and the upper air channel 38 and exit the air outlet 16 in essentially a straight-forward direction.

In order to modify the air flow direction out of the air outlet 16 of the air vent 10, the shape memory alloy element 30 of the actuator 24 can be heated or cooled. Upon such a temperature change, the lattice structure of the shape memory alloy element 30 changes, usually between austenite and martensite. The heating can be provided by applying an electrical current which resistively heats up the shape memory alloy element 30, while the cooling is usually provided by the passing air stream.

Figure 2:
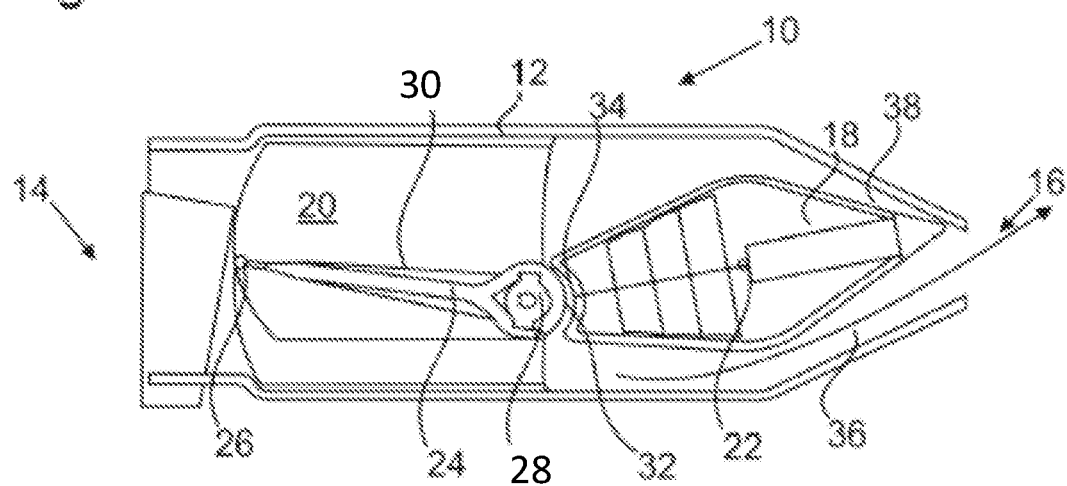
FIG. 2 is a schematic representation of the air vent according to FIG. 1 configured for an upward air outlet direction.
Figure 3:
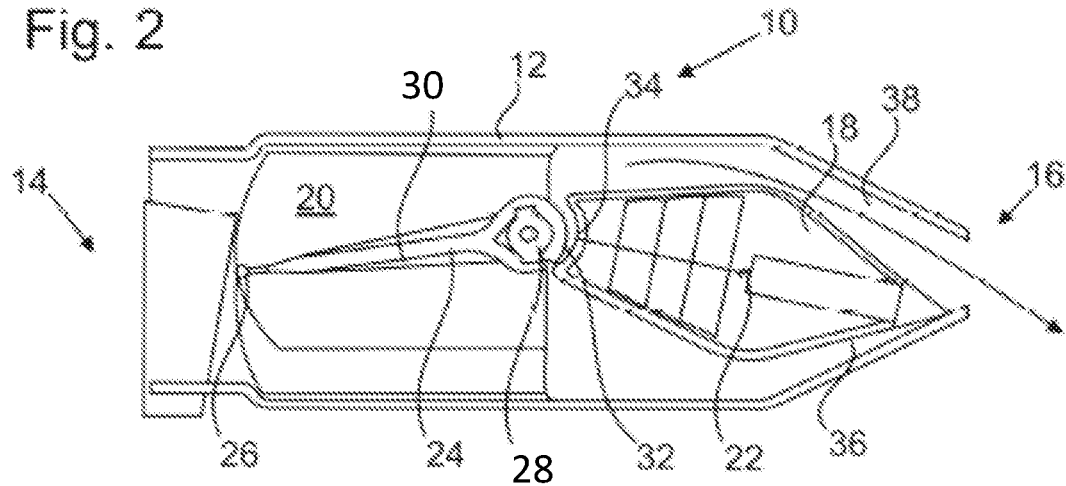
FIG. 3 is a schematic representation of the air vent according to FIG. 1 configured for a downward air outlet direction.

The shape change of the shape memory alloy element 30 exerts a torque on the transmission element 28 around the second axis 26. Consequently, the actuator 24 rotates around the second axis 26. For example, as shown in FIG. 2, the actuator 24 rotates around the second axis 26 in a clockwise manner upon heating and, as shown in FIG. 3, in a counterclockwise manner upon cooling. This is, of course, only an example depending on constructive details. It is equally possible, that heating of the shape memory allow element 30 leads to a counterclockwise rotation of the actuator 24 and cooling of the shape memory alloy element 30 leads to a counterclockwise rotation.

If the actuator 24 rotates in a clockwise manner as shown in FIG. 2, the convex surface 32 of the actuator 24 exerts a force on the concave surface 34 of the air guiding body 18, so that the air guiding body 18 rotates in a counterclockwise manner around the first axis 22. As can be seen in FIG. 2, this leads to a closing of the upper air flow channel 38, whereas the lower air channel 36 is fully opened. The air stream through the housing 12 of the air vent 10 now completely flows through the lower air channel 36 and is thus directed in an upward direction by the nozzle shaped geometry of the air outlet 16.

On the other hand, if the actuator 24 is rotated in a counterclockwise manner around the second axis 26, as shown in FIG. 3, the air guiding body 18 rotates in a clockwise manner around the first axis 22, thus closing the lower air channel 36 and fully opening the upper air channel 38, leading in a downward flow of the air exiting the air outlet 16 of the air vent 10.

Due to the inherently silent nature of a shape memory alloy actuator 24 and the aerodynamic geometry of the air guiding body 18 any change in air flow direction from the air outlet 16 of the air vent 10 can be performed in a particular silent manner.

In summary, an air vent 10 is provided which is particularly compact and silent.

Features of the embodiments of the present invention disclosed in the above description, in the claims, and in the drawings, can be essential both individually and in any combination required in order to realize the invention in its different embodiments.

REFERENCE SIGN LIST 10 air vent
12 housing
14 air inlet
16 air outlet
18 air directing body
20 air channel
22 first axis
24 actuator
26 second axis
28 transmission element
30 shape memory alloy element
32 convex surface
34 concave surface
36 lower air channel
38 upper air channel

What is claimed is:
1. An air vent for a vehicle, comprising
a housing with an air inlet, an air outlet, and an air channel between the air inlet and the air outlet;
a rigid air directing body arranged within the air channel and pivotable around a first axis;
an actuator arranged within the housing in order to act on the rigid air-directing body to determine a direction of an air stream exiting the air outlet, the actuator comprising a transmission element, the transmission element pivotable around a second axis,
wherein the actuator further comprises a shape memory alloy element, and wherein the transmission element is pivotable around the second axis by the shape memory alloy element.

2. The air vent according to claim 1, wherein the direction of the air stream exiting the air outlet is modified by heating or cooling the shape memory alloy element.

3. The air vent according to claim 1, wherein heating or cooling the shape memory alloy element causes a shape of the shape memory alloy element to change exerting a torque on the transmission element around the second axis.

4. The air vent according to claim 1, wherein the first axis runs parallel to the second axis.

5. The air vent according to claim 4, wherein the first axis and the second axis are arranged orthogonal to the longitudinal axis of the air channel.

6. The air vent according to claim 1, wherein the transmission element comprises a convex surface engaging with a complementary concave surface of the rigid air-directing body.

7. The air vent according to claim 6, wherein the concave surface is at least one of spaced apart from the first axis or facing in the direction of the air inlet, and the convex surface is at least one of spaced apart from the second axis or facing in the direction of the air outlet.

8. The air vent according to claim 1, wherein the air channel comprises a lower air channel and an upper air channel, and the shape memory alloy element is adapted to rotate the transmission element within the air channel in order to determine the lower and upper air channels.

9. The air vent according to claim 1, wherein the rigid air-directing body is aerodynamically shaped or torpedo shaped.

10. The air vent according to claim 1, wherein the air outlet forms a nozzle.

11. An air vent for a vehicle, comprising a housing with an air inlet, an air outlet, and an air channel between the air inlet and the air outlet;
a rigid air directing body arranged within the air channel and pivotable around a first axis; and
an actuator arranged within the housing in order to act on the rigid air-directing body to determine a direction of an air stream exiting the air outlet, the actuator comprising a transmission element and a shape memory alloy element, the transmission element pivotable around a second axis by the shape memory alloy element,
wherein the transmission element comprises a convex surface engaging with a complementary concave surface of the rigid air-directing body, and
wherein the concave surface is facing in the direction of the air inlet, and the convex surface is facing in the direction of the air outlet.

12. The air vent according to claim 11, wherein the direction of the air stream exiting the air outlet is modified by heating or cooling the shape memory alloy element.

13. The air vent according to claim 11, wherein heating or cooling the shape memory alloy element causes a shape of the shape memory alloy element to change exerting a torque on the transmission element around the second axis.

14. The air vent according to claim 11, wherein the first axis runs parallel to the second axis.

15. The air vent according to claim 14, wherein the first axis and the second axis are arranged orthogonal to the longitudinal axis of the air channel.

16. The air vent according to claim 11, wherein the air channel comprises a lower air channel and an upper air channel, and the shape memory alloy element is adapted to rotate the transmission element within the air channel in order to determine the lower and upper air channels.

17. The air vent according to claim 11, wherein the rigid air-directing body is aerodynamically shaped or torpedo shaped.

18. The air vent according to claim 11, wherein the air outlet forms a nozzle.

19. A vehicle comprising the air vent according to claim 1 or claim 11.

\* \* \* \* \*